United States Patent [19]

Kubo et al.

[11] Patent Number: 6,067,294
[45] Date of Patent: *May 23, 2000

[54] WIRELESS COMMUNICATION SYSTEM AND WIRELESS COMMUNICATION APPARATUS

[75] Inventors: Toru Kubo, Yokohama; Kazuaki Yamaguchi; Masataka Sugiura, both of Tokyo, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,377

[22] Filed: Aug. 26, 1996

[30] Foreign Application Priority Data

Sep. 8, 1995 [JP] Japan ................................. 7-255754

[51] Int. Cl.[7] ............................................. H04B 7/212
[52] U.S. Cl. .................................... 370/347; 370/350
[58] Field of Search ................................ 370/235, 312, 370/313, 314, 321, 324, 329, 336, 337, 347, 375, 442, 503, 509, 512; 348/6, 7, 8, 12, 13

[56] References Cited

U.S. PATENT DOCUMENTS

| | | | |
|---|---|---|---|
| 5,541,979 | 7/1996 | Leslie et al. ................ | 379/60 |
| 5,570,352 | 10/1996 | Poyhonen . | |
| 5,590,133 | 12/1996 | Billstrom et al. ............ | 370/349 |
| 5,604,744 | 2/1997 | Andersson et al. .......... | 370/347 |
| 5,625,629 | 4/1997 | Wenk ............................ | 370/347 |

*Primary Examiner*—Ajit Patel
*Attorney, Agent, or Firm*—Pollock, Vande Sande & Amernick

[57] ABSTRACT

A wireless communication system comprises: a center unit and a plurality of terminal units, wherein the center unit includes: a transmitting portion for recurrently generating time slots and transmitting data through the set of time slots; a broadcasting control portion for respectively sending information of at least a predetermined time slot to be used out of the time slots for broadcast to the plurality of terminal units through the transmitting portion and for operating the transmitting portion to transmit the data to be broadcasted through at least the predetermined time slot; and each of the terminal unit includes: a receiving portion for receiving the data through one of time slots assigned to each of the terminal unit out of the time slots; and a broadcasting receiving control portion for receiving the information through the receiving portion and for controlling the receiving portion to receive the data to be broadcasted using the predetermined time slot with reference to the information. The center unit may broadcast the data using both time slots of upward and downward transmission and may synchronize a top of reference frame of the data including video data of moving pictures with a top of the slot for broadcasting.

6 Claims, 7 Drawing Sheets

WIRELESS COMMUNICATION SYSTEM AND WIRELESS COMMUNICATION APPARATUS

BACKGROUND OF THE INVENTION

1. Field of the Invention

This invention relates to a wireless communication system for providing wireless communication between a wireless communication apparatus and wireless communication terminals through time-division multiple access and the wireless communication apparatus for providing wireless communication through time-division multiple access.

2. Description of the Prior Art

A prior art wireless communication system for providing wireless communication between a wireless communication apparatus and wireless communication terminals through time-division multiple access is known. FIG. 7 is a drawing of a time chart of a prior art format of wireless communication through time-division multiple access known as personal handy phone system (PHS).

In the PHS, one channel of a radio wave signal is time-divided to provide eight time slots 201 to 208. In this system, pairs of time slots 201 and 205, 202 and 206, 203 and 207, and 204 and 208 are assigned to the same calls of upward transmission (toward base station) and downward transmission (from the base station). Therefore, there are four calls (communications) per one channel of the radio wave signal.

FIG. 6 is a block diagram of a prior art communication system of PHS.

A center apparatus (base station) 301 comprises a serving portion 3015 for providing information requested from terminals 302, a center call control portion 3014 for controlling connection between the center apparatus 3015 and terminals 302, and a plurality of connection units 303. Each of connection units 303 comprises a center transmission portion 3011 for transmitting wireless transmission data to terminals 302, a center receiving portion 3012 for receiving wireless transmission data from the terminals 302, and a center TDMA control portion 3013 for controlling the center transmission portion 3011 and the center receiving portion 3012 every time slot.

The terminal 302 comprises a terminal transmission portion 3021 for transmitting wireless transmission data to the connection unit 303, a terminal receiving portion 3022 for receiving wireless transmission data from the connection unit 303, a terminal TDMA control portion 3023, a terminal call control portion 3024 for controlling making a call using the terminal TDMA control portion 3023, and a service receiving portion 3025 for displaying the provided service.

When a user inputs a connection starting request to the service receiving portion 3025 of the terminal 302, the terminal call control portion 3024 makes a connection to the center call control portion 3014 of the center apparatus 3015.

Then, the center call control portion 3014 provides the channel and the time slot to be used. The terminal TDMA control portion 3023 informed of the channel and the time slot by the terminal call control portion 3024 affects data transmission to the center apparatus 301 and data receiving from the center apparatus 301 by operating the terminal transmission portion 3021 during a transmitting interval and terminal receiving portion 3022 for a receiving interval using the provided channel and time slots.

As mentioned a transmission passage is established between the terminal 302 and the center apparatus 301. This makes it possible that the service receiving portion 3025 displays a request for the center apparatus 301 and service information received from the center apparatus 301.

On the other hand, when the center call control portion 3014 of the center apparatus 301 affects a connection to the terminal 302, the center call control portion 3014 similarly determines the channel and time slots to be used it self similarly itself. The center TDMA control portion 3013 affects data transmission and data receiving to the terminal apparatus 302 by operating the center transmission portion 3011 for a transmitting interval and center receiving portion 3012 for a receiving interval using the provided channel and time slots. As the result, information corresponding to the request by the terminal apparatus 302 is provided from the serving portion 3015.

SUMMARY OF THE INVENTION

The aim of the present invention is to provide an improved wireless communication system and wireless communication apparatus.

According to the present invention a wireless communication system is provided which comprises: a center apparatus and at least a terminal apparatus transmitting data to each other using time slots provided by the time division multiply access, wherein the center apparatus determines one of the time slots for broadcasting and broadcasts data to a plurality of terminals using the determined time slot at the same time.

In the wireless communication system, the center apparatus broadcasts the data using both time slots of upward and downward transmission.

In the wireless communication system, the center apparatus synchronizes a top of reference frame of the data including video data of a moving picture with a top of the time slot for broadcasting.

According to this invention, a wireless apparatus is provided which comprises: a center unit and a plurality of terminal units, wherein the center unit includes: a transmitting portion for recurrently generating time slots and transmitting data through time slots; a broadcasting control portion for respectively sending information of at least a predetermined time slot to be used out of the time slots for broadcast to the plurality of terminal units through the transmitting portion and for operating the transmitting portion to transmit the data to be broadcasted through at least the predetermined time slot; and each of the terminal unit includes: a receiving portion for receiving the data through one of time slots assigned to each of the terminal unit out of the time slots; and a broadcasting receiving control portion for receiving the information through the receiving portion and for controlling the receiving portion to receive the data to be broadcasted using the predetermined time slot with reference to the information.

In the wireless apparatus, the center unit further includes a center unit's receiving portion for receiving the data from the terminal unit, the transmitting portion recurrently generates the time slots to include downward time slots and corresponding upward time slots, the broadcast transmitting portion controls the transmitting portion to transmit the data to be broadcasted through at least one of the downward time slots and at least one of the upward time slots corresponding to at least one of the downward time slots, and the center unit's receiving portion receives the data from the terminal unit using remaining upward time slots.

In the wireless apparatus, the center unit further includes a dividing portion for receiving a series of video data of a moving picture to be broadcasted which recurrently includes an intra-predicted frame, and for dividing the series of video data of a moving picture into blocks corresponding to at least one of predetermined time slots which are recurrently generated with a top of the intra-predicted frame, synchronized with a top of at least one of predetermined time slot. The broadcasting control portion controls the transmitting portion to transmit the series of video data from the dividing portion as the data to be broadcasted through at least the predetermined time slot.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
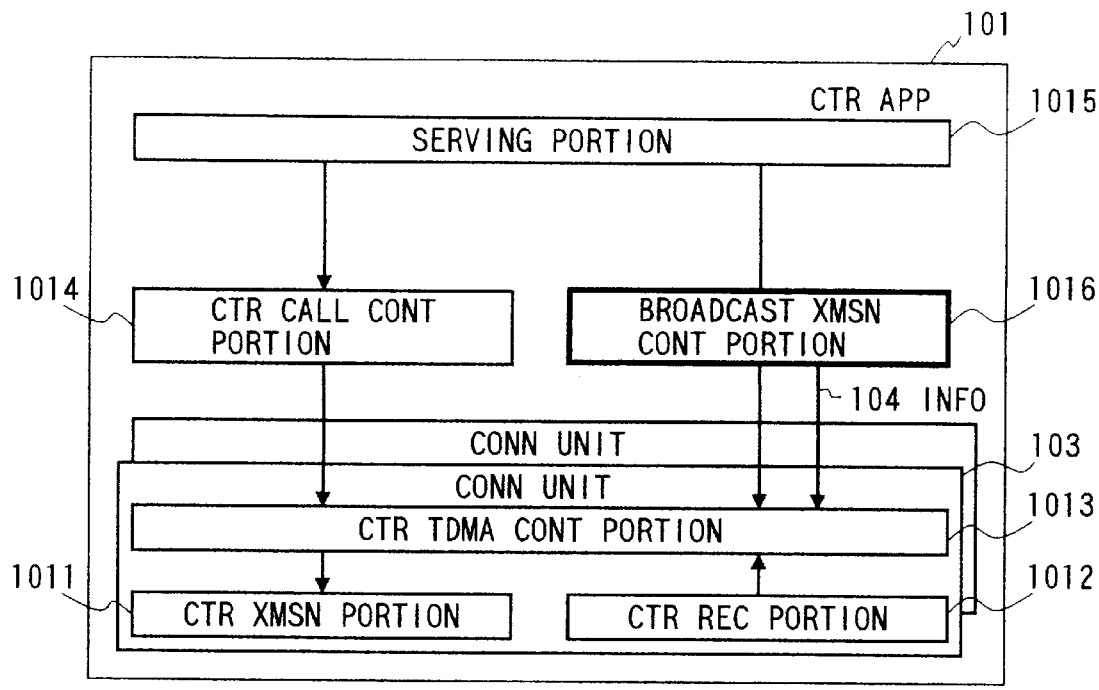
FIG. 1 is a block diagram of a wireless communication system of a first embodiment.
Figure 1:
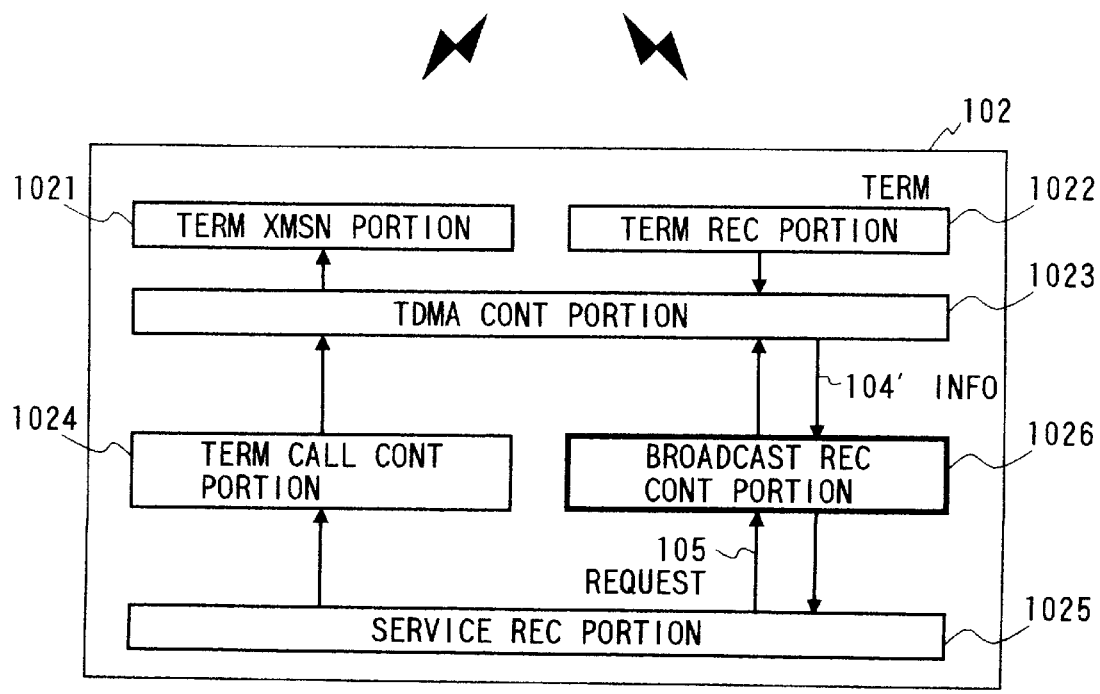

FIG. 1 is a block diagram of a wireless communication system of the first embodiment.

The wireless communication of the first embodiment comprises a center apparatus 101 and terminals 102. The center apparatus 101 comprises a serving portion 1015 for providing information requested, a center call control portion 1014 for controlling connection between the center apparatus 1015 and the terminals 102, a broadcast transmission control portion 1016 for controlling the broadcast transmission, and a plurality of connection units 103 for providing wireless connection with respective terminals 102.

Each of connection units 103 comprises a center transmission portion 1011 for transmitting wireless transmission data to terminals 102, a center receiving portion 1012 for receiving wireless transmission data from the terminals 102, and a center TDMA control portion 1013 for controlling the center transmission portion 1011 and the center receiving portion 1012 every time slot.

Each of the terminals 102 comprises a terminal transmission portion 1021 for transmitting wireless transmission data to the connection unit 103, a terminal receiving portion 1022 for receiving wireless transmission data from the connection unit 103, a terminal TDMA control portion 1023 for controlling the terminal transmission portion 1021 and the terminal receiving portion 1022 every time slot, a terminal call control portion 1024 for controlling making a call using the terminal TDMA control portion 1023, a broadcast receiving control portion 1026 for controlling receiving of broadcasting, and a service receiving portion 1025 for displaying the provided service.

When the center apparatus 101 transmits the same data to a plurality of terminals 102 at the same, a broadcast transmission is used. In this case, the broadcast transmission control portion 1016 determines the channel and at least a time slot to be used for the broadcast transmission and obtains transmission data from the serving portion 1015 and sends information 104 indicative of the channel and the time slot for broadcasting to the center TDMA control portion 1013 and respective broadcast receiving control portion 1026. In response to this, the center TDMA control portion 1013 operates the center transmission portion 1011 to transmit the transmission data for the transmission interval of the time slots for broadcast transmission.

Figure 2:
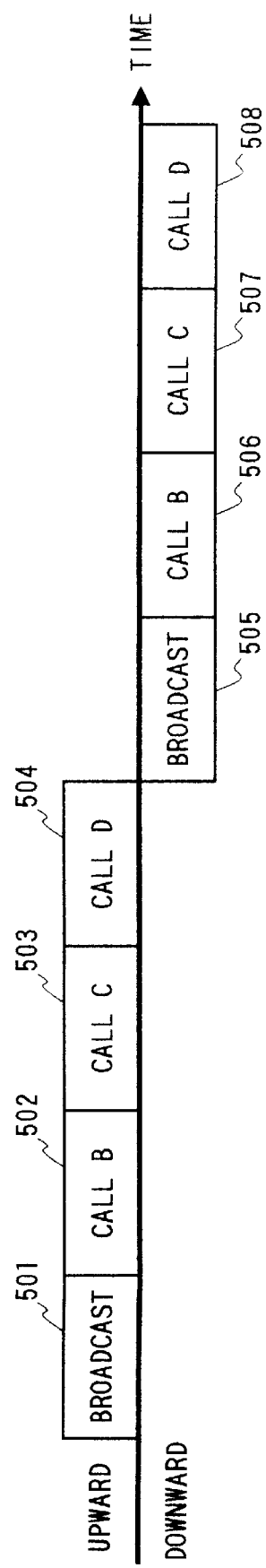
FIG. 2 is a drawing of a time chart of a format of wireless communication through time-division multiple access of this invention.

FIG. 2 is a drawing of a time chart of a format of wireless communication through time-division multiple access of this invention.

The broadcast transmission is affected using a broadcast time slot 505 of downward transmission (from the center apparatus to terminals). The corresponding time slot 501 of upward transmission (toward the center apparatus 101) is not used for receiving.

On the side of the terminal 102, when the service receiving portion 1025 supplies a request for broadcast receiving to the broadcast receiving portion 1026, the broadcast receiving control portion 1026 determines the channel and the time slot 505 to be used for broadcasting. More specifically the broadcast receiving control portion is informed of the broadcast receiving time slot with the information 104' from the center apparatus 101 in advance. Then, the terminal TDMA control portion 1023 receives the broadcasted data from the center apparatus 101 by operating the terminal receiving portion 1022 for the receiving interval of the broadcast receiving time slot in accordance with the determined time slot 505. Then, the service receiving portion 1025 can display the broadcasted data from the center apparatus 101.

During this operation, the terminal 102 only affects receiving data, so that an extremely large number of terminals within the area can receive the broadcasted data at the same time.

Moreover, if the center apparatus has a plurality of connection units 103, it is possible to expand the area in which the terminals 102 can receive the service by transmitting the broadcast data using a plurality of connection units 103 with the same channel and the same time slot in parallel at the same time.

Figure 7:
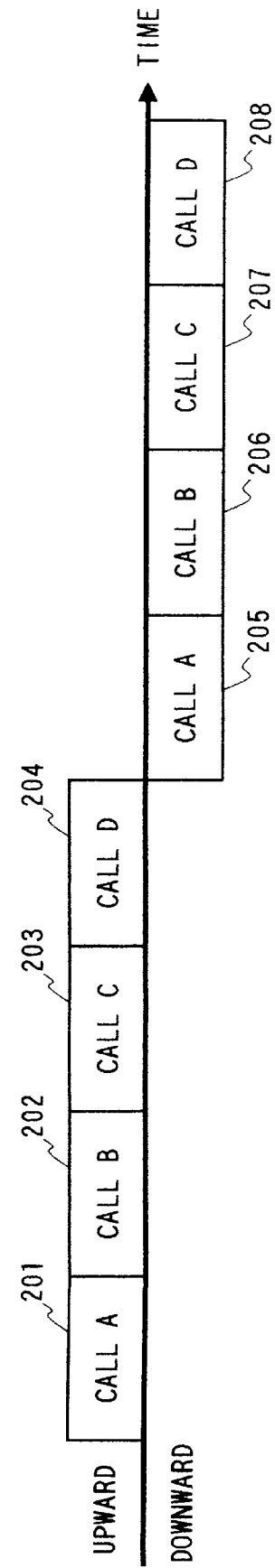
FIG. 7 is a drawing of a time chart of a prior art format of wireless communication] through time-division multiple access known as personal handy phone system (PHS).

The communication between the terminal 102 and the center apparatus 101 can be provided substantially at the same time as the broadcasting using the remaining time slots 502 and 506, 503 and 507, and 504 and 508 as similar to the prior art shown in FIG. 7.

As mentioned, in the wireless communication system of the first embodiment, with the broadcasting, the terminals of which number is larger than the number of terminals connected by the conventional TDMA connection can receive the same data at the same time.

A second embodiment will be described.

Figure 3:
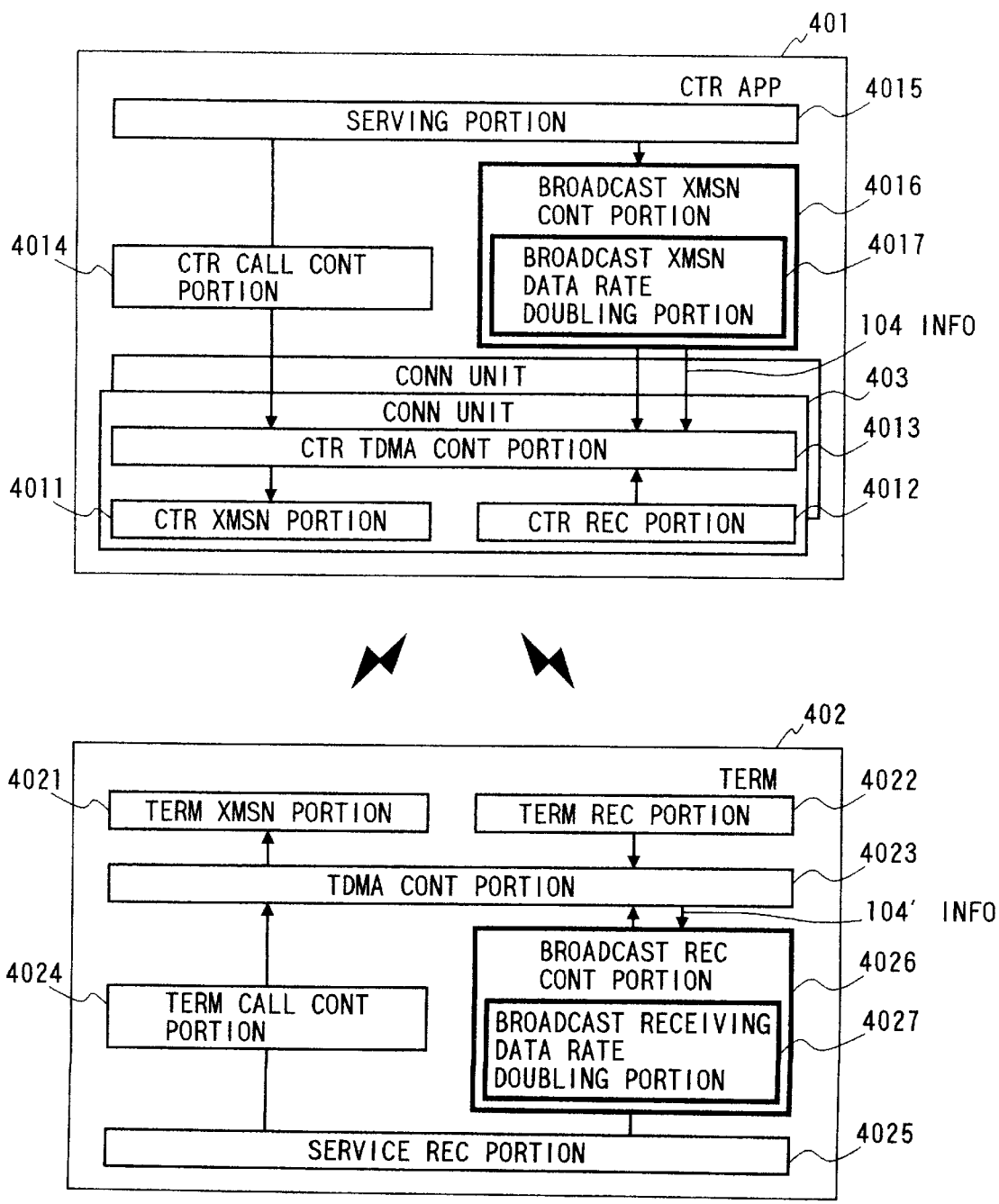
FIG. 3 is a block diagram of a wireless communication system of a second embodiment.

FIG. 3 is a block diagram of a wireless communication system of the second embodiment.

The wireless communication system of the second embodiment has substantially the same structure and operation as that of the first embodiment. Differences are in that the broadcasting control portion 4016 further comprises a broadcasting transmission data rate doubling portion 4017 for doubling a broadcasting transmission data rate and each of the broadcast receiving portions 4026 of the terminals 402 further comprises a broadcast receiving data rate doubling portion 4027 for doubling a broadcast receiving data rate.

The broadcasting transmission data rate doubling portion 4017 of the center apparatus 401 commands the center TDMA control portion 4013 to use a time slot 501 for upward transmission in addition to the time slot 505 for downward transmission as the broadcast slot. In response to this, the center TDMA control portion 4013 operates the center transmission portion 4011 for the interval of the time slots 501 and 505. Therefore, an amount of data transmitted is double of that by only time slot 505.

On the other hand, broadcast receiving data rate doubling portion 4027 of the terminal 402 commands the terminal TDMA control portion 4023 to use a time slot 501 in addition to the time slot 505 as broadcast receiving slots for receiving the broadcasted data. In response to this, the terminal TDMA control portion 4023 operates the terminal receiving portion 4022 for the interval of the time slots 501 and 505 to receive the broadcasted data. As the result the service receiving portion 4025 can display data through two slots from the center apparatus 401.

As mentioned in the wireless communication system of the second embodiment, when the same data is broadcasted from the center apparatus 401 to a plurality of terminals, a data rate of broadcasting is twice that of the first embodiment with the same number of time slots.

A third embodiment will be described.

Figure 4:
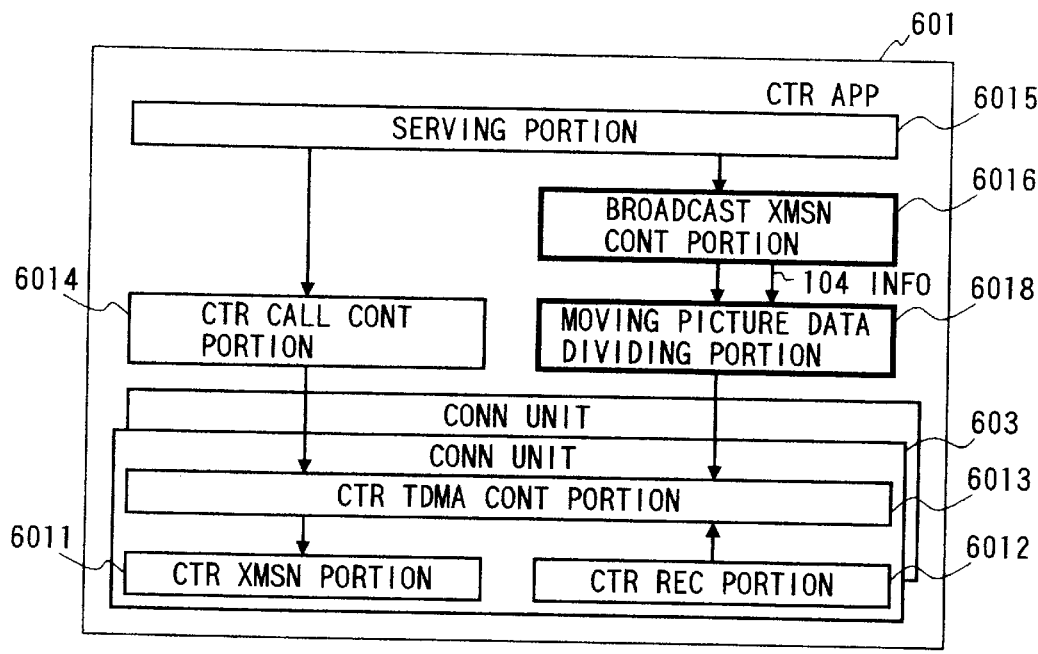
FIG. 4 is a block diagram of a wireless communication system of the third embodiment.
Figure 4:
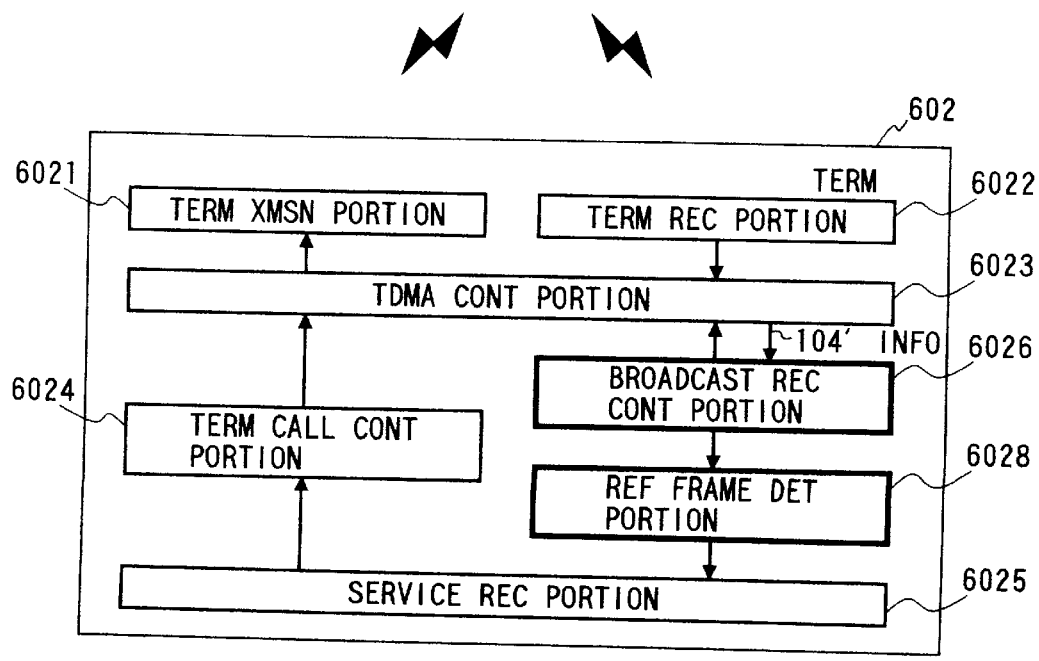

FIG. 4 is a block diagram of a wireless communication system of the third embodiment.

The wireless communication system of the third embodiment has substantially the same structure and operation as that of the first embodiment. Differences are in that the center apparatus 601 further comprises a moving picture dividing portion 6018 for synchronizing a top of reference frame of a moving picture video signal to be broadcasted with a top of slot and each of terminals 602 further comprises a reference frame detection portion 6028 for judging whether or not there is the top of the reference frame at the top of the time slot.

The moving picture data dividing portion 6018 divides the video data of moving picture such that a top of each reference frame is synchronized with a top of transmission time slot if the serving portion 6015 provides video signal data of a of moving picture.

Figure 5:
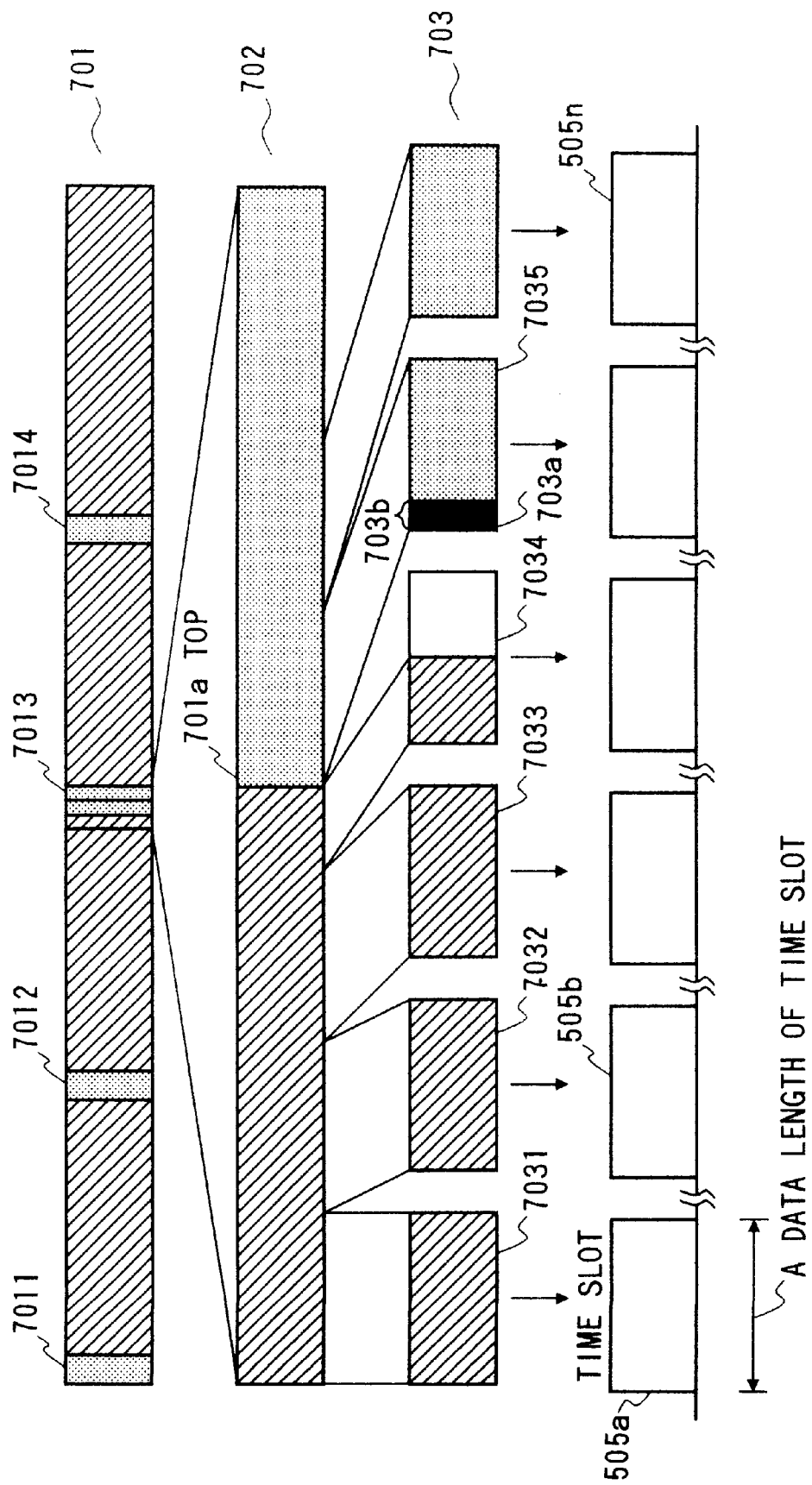
FIG. 5 is an illustration of the third embodiment illustrating dividing video data of moving picture.
Figure 6:
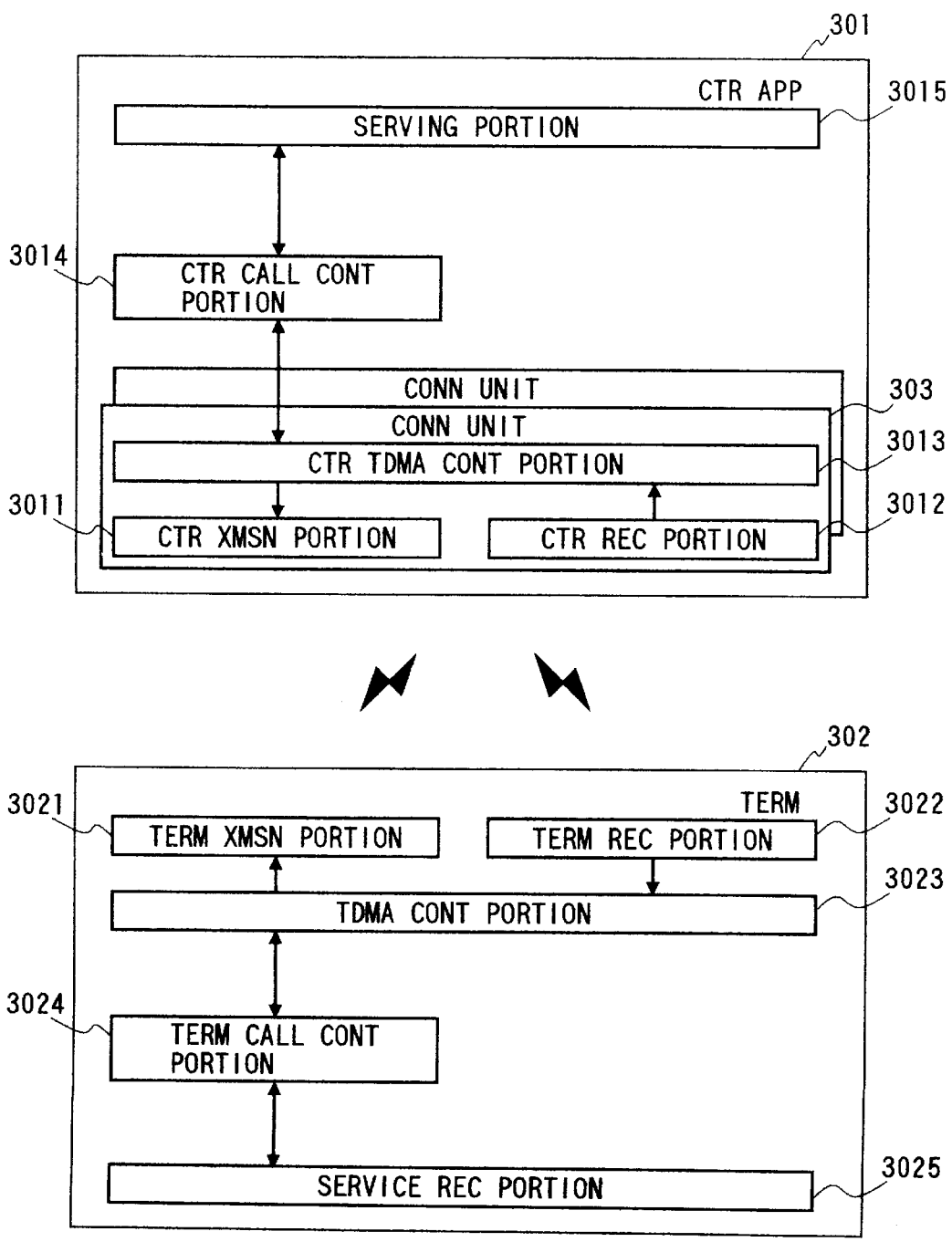
FIG. 6 is a block diagram of a prior art communication system of PHS.

FIG. 5 is an illustration of the third embodiment illustrating dividing video data of a moving picture.

Video data train 701 includes a reference frame (Intracoded picture) including all data of one frame and other frames including data of difference from other frames (P picture, B picture). The reference frames 7011 to 7014 are intermittently interposed between other frames in the video data train 701.

A portion 702 of the video data train 701 includes one of B or P picture frames followed by one of reference frames and is divided into a series of blocks 703. The series of blocks 703 are assigned to transmission time slots 505a to 505n respectively. The video data train 701 is divided into blocks 7031 to 7035 by the moving picture dividing portion 6018 as follows:

When the moving picture dividing portion 6018 detects a top 701a of a reference frame, the moving picture dividing portion 6018 divides the video data into a block 7034 of the video data before the reference frame and a block including a top 703a of the reference frame though the block 7034 just before the reference frame is not entirely filled with the video data. A header 703b indicative of a top of the reference frame is inserted in the following block 7035.

Therefore, the top 703a of the reference frame is always located at the top of a time slot 505.

On the other hand, the reference frame detection portion 6028 of the terminal 602 judges every block of data transmitted in a time slot includes the header 703b indicative of the reference frame from the video data received under the control of the terminal TDMA control portion 6023 and when it detects the header 703ab, i.e., the top 703a of the reference frame, the reference frame detection portion 6028 informs the service receiving portion 6025 of receiving the reference frame.

The service receiving portion 6025 reproduces the video data of moving picture from the received data from the reference frame detection portion 6025 and displays it.

If displaying the video data of the moving picture stops due to a receiving error or the like, the service receiving portion 6025 restarts displaying when the service receiving portion 6025 receives the reference frame. Therefore, the video data of moving picture can be reproduced properly.

As mentioned, in the wireless communication system of the third embodiment, though there is a communication error while a video data of moving picture is broadcasted from the center apparatus 601 to terminals 602, the reproduction of the video data of moving picture can be properly restored on only terminal sides.

Moreover, though one of terminals starts receiving the video data of moving picture from the middle of the video data train 701, it can reproduce the video data of moving picture at once by detecting the reference frame.

As mentioned, according to this invention, the wireless communication system comprises: a center unit 101 and a plurality of terminal units 102.

The center unit 101 includes: the transmitting portion 1011 and the center TDMA portion 1013 for recurrently generating time slots 501–508 and transmitting data through the set of time slots 501–504; a broadcasting control portion 1016 for respectively sending information 104 of at least a predetermined time slot 505 to be used for broadcast to the plurality of terminal units 102 through the center transmitting portion 1011 and for operating the center transmitting portion 1011 to transmit the data to be broadcasted through at least the predetermined time slot 505.

Each of the terminal unit 102 includes: a receiving portion 1022 for receiving the data through one of time slots 506, 507, or 508 assigned to each of the terminal units out of the time slots 505–508; and a broadcasting receiving control portion 1026 for receiving the information 104 through the receiving portion 1022 and for controlling the receiving portion 1022 to receive the data to be broadcasted using the predetermine time slot 505 with reference to the information 104.

According to the second embodiment, the center unit 401 further includes a center apparatus receiving portion 4012 for receiving the data from the terminal units 402, the center transmitting portion 4011 recurrently generates the time slots to include downward time slots 505–508 and corresponding upward time slots 501–504, the broadcast transmitting portion 4016 controls the transmitting portion 4011 to transmit the data to be broadcasted through at least one of the downward time slots 505 and at least one of the upward time slots 501 corresponding to at least the one of the downward time slots 505, and the center apparatus receiving portion 4012 receives the data from the terminal units 402 using one of remaining upward time slots 502, 503, or 504.

According to the third embodiment, the center unit 601 further includes the moving picture dividing portion 6018 for receiving a series (data train) of video data of moving picture 701 to be broadcasted which recurrently includes an intra-predicted (reference) frame 7011–7014 and for dividing the series of video data 701 of moving picture into blocks 7031–7035 corresponding to at least one of predetermined time slot 505 recurrently generated with a top 701a of the intra-predicted frame synchronized with a top 703a of at least one of predetermined time slot and the broadcasting control portion 6016 controls the transmitting portion 6011 to transmit the series of video data from the moving picture dividing portion 6018 as the data to be broadcasted through at least the predetermined time slot 505.

What is claimed is:

1. A wireless apparatus comprising:

a center unit and a plurality of terminal units, wherein said center unit includes:
transmitting means for recurrently generating a first group and second group of time slots, and transmitting data through said time slots;
broadcasting control means for respectively sending information in at least one predetermined time slot of said first group of time slots and one predetermined time slot of said second group of time slots to said plurality of terminal units through said transmitting means, and for operating said transmitting means to transmit said data to be broadcasted through said predetermined time slots;
receiving means which receives data from said terminal units using remaining of said first group of time slots;
dividing means for receiving a series of video data of a moving picture to be broadcasted which recurrently includes an intra-predicted frame, and for dividing said series of video data of a moving picture into blocks corresponding to at least one of said predetermined time slots, synchronized with a beginning of said at least one of predetermined time slot, and said broadcasting control means controls said transmitting means to transmit said series of video data from said dividing means as data to be broadcasted through at least said predetermined time slot, and wherein
each terminal unit includes:
receiving means for receiving said data through one of said time slots assigned to each terminal unit; and
broadcasting receiving control means for receiving said information through said receiving means and for controlling said receiving means to receive said data using at least one of said predetermined time slots.

2. A wireless communication system comprising:

a center apparatus and a plurality of terminal apparatus transmitting data to each other using time slots provided by time division multiple access, wherein said center apparatus broadcasts moving picture data as said data, said moving picture data periodically including a reference frame, wherein said center apparatus includes:
broadcast transmission control means for determining at least one of said time slots as a downward time slot, and for transmitting broadcast time slot data indicative of the determined downward time slot;
moving picture data dividing means for detecting said reference frame and for dividing said moving picture data at said reference frame, and supplying said moving picture data to a broadcasting means to transmit said moving picture data before said reference frame through one time slot and said moving picture data including said reference frame through a next time slot to position said reference frame at the beginning of a next time slot, synchronizing said reference frame with the next time slot;
broadcasting means for broadcasting said moving picture data to a plurality of said terminal apparatus at the same time through the determined time slot, said terminal apparatus including:
a broadcast receiving control means for receiving said broadcast time slot data;
reference frame detection means for detecting said reference frame in the received data at the top of said time slot; and
broadcast receiving means for receiving said data from said broadcasting means through the determined time slot indicated by the received broadcast time slot data, and for servicing the received data for a user of said terminal apparatus in accordance with said detected reference frame.

3. The wireless communication system as claimed in claim 2, wherein said time slots includes a first group of time slots and respectively corresponding second group of time slots, and said broadcast transmission control means determines said downward time slot from said second group of time slots.

4. The wireless communication system as claimed in claim 3, wherein said broadcast transmission control means transmits said broadcast time slot data further indicating the time slot in said first group of time slots corresponding to the determined downward time slot of said second group of time slots, and said broadcast receiving means receives said data from said broadcasting means through the determined downward time slot and the corresponding time slot of said first group of time slots indicated by the received broadcast time slot data.

5. The wireless communication system as claimed in claim 2, wherein said broadcast receiving means includes reproducing means for reproducing the moving picture data as the received data and providing reproduced moving picture data to said user.

6. The wireless communication system as claimed in claim 2, wherein said broadcast receiving means includes reproducing means for reproducing the received data and providing reproduced data to said user.

* * * * *